(12) United States Patent
Jiang et al.

(10) Patent No.: US 10,889,516 B2
(45) Date of Patent: Jan. 12, 2021

(54) SIPHON TYPE COMPOSITE VERTICAL SUBSURFACE FLOW CONSTRUCTED WETLAND

(71) Applicant: ENERGY RESEARCH INSTITUTE OF JIANGXI ACADEMY OF SCIENCES, Nanchang (CN)

(72) Inventors: Cheng Jiang, Nanchang (CN); Jiaqi Fu, Nanchang (CN); Zhaohuan Mai, Nanchang (CN); Jiujiu Wu, Nanchang (CN)

(73) Assignee: Energy Research Institute of Jiangxi Academy of Sciences

( * ) Notice: Subject to any disclaimer, the term of this patent is extended or adjusted under 35 U.S.C. 154(b) by 0 days.

(21) Appl. No.: 16/415,060

(22) Filed: May 17, 2019

(65) Prior Publication Data
US 2019/0352204 A1    Nov. 21, 2019

(30) Foreign Application Priority Data

May 18, 2018   (CN) .......................... 2018 1 0479321

(51) Int. Cl.
| | | |
|---|---|---|
| B01D 24/04 | (2006.01) | |
| C02F 1/00 | (2006.01) | |
| E03F 5/14 | (2006.01) | |
| C02F 3/32 | (2006.01) | |
| E03F 1/00 | (2006.01) | |

(52) U.S. Cl.
CPC ............ *C02F 3/327* (2013.01); *B01D 24/047* (2013.01); *C02F 1/001* (2013.01); *E03F 1/00* (2013.01); *E03F 5/14* (2013.01); *Y02W 10/10* (2015.05)

(58) Field of Classification Search
CPC .. C02F 3/327; C02F 3/308; C02F 3/30; C02F 3/32; C02F 1/001; B01D 24/047; E03F 1/00; E03F 5/14

USPC ....... 210/602, 615–617, 252, 255, 263, 287, 210/289, 290
See application file for complete search history.

(56) References Cited

U.S. PATENT DOCUMENTS

| | | | | |
|---|---|---|---|---|
| 5,486,291 A | * | 1/1996 | Todd ........................ | C02F 3/00 210/602 |
| 7,857,967 B2 | * | 12/2010 | Lee .......................... | E02B 8/02 137/140 |
| 2016/0207808 A1 | * | 7/2016 | Castellanos Rold N ..... | C02F 9/00 |

FOREIGN PATENT DOCUMENTS

| | | | |
|---|---|---|---|
| CN | 105502673 | * | 4/2016 |
| CN | 206069522 | * | 4/2017 |

* cited by examiner

*Primary Examiner* — Nam X Nguyen
*Assistant Examiner* — Julia L. Wun
(74) *Attorney, Agent, or Firm* — Avant Law Group, LLC

(57) ABSTRACT

A siphon type composite vertical subsurface flow constructed wetland has an uplink pool with a depth ¾ that of a downlink pool. Siphon-type drain tubes are equidistantly distributed at a first outer side of the uplink pool, and a total flow of the drain tubes is slightly greater than a largest total influent flow. Three layers of substrates are paved on each pool. A substrate on a first layer is a biological ceramsite having a relatively small grain size, another substrate on a second layer is zeolite having a relatively large grain size, and a further substrate on a third layer is cobblestone having a large grain size. The third layers of the pools are integrally communicated, and sewage in the downlink pool flows to the uplink pool through a communication port. Sludge on bottom layers of the pools is discharged from a siphon tube with water.

2 Claims, 1 Drawing Sheet

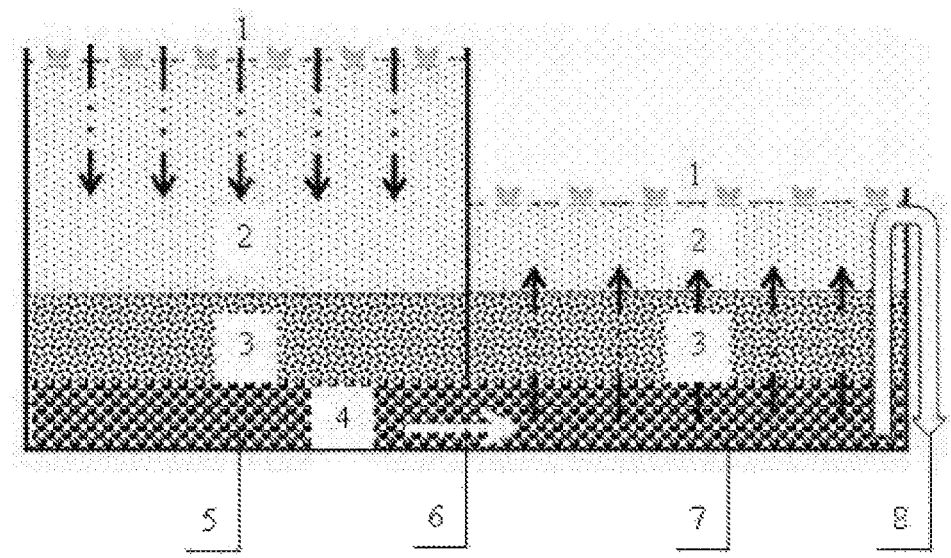

SIPHON TYPE COMPOSITE VERTICAL SUBSURFACE FLOW CONSTRUCTED WETLAND

CROSS REFERENCE TO RELATED APPLICATIONS

This application claims priority to Chinese application number 20181047932-1.2 filed on May 18, 2018, the disclosure of which is incorporated by reference herein in its entirety.

FIELD OF THE DISCLOSURE

The disclosure relates generally to the field of ecological protection. More specifically, the disclosure relates to the field of a siphon type composite vertical subsurface flow constructed wetland.

BACKGROUND

Water pollution induces deterioration of water environment, which directly influences people's production and living. Research and development of a sewage treatment technology and process have always been continuously progressed. With the continuous improvement and development of the sewage treatment process or technology, limitation of the traditional technology and process such as a biological method and an ecological method has been emerged in time or space.

The constructed wetland is widely applied due to efficient sewage pollutant removal and an economic operation mode of the constructed wetland. Compared with other sewage treatment processes, sewage treatment of the constructed wetland has many advantages of stable effluent, low construction and operation costs, simple maintenance, high treatment efficiency, wide application range and strong applicable capability of load change.

In research and application of the constructed wetland, some problems are found, for example, blockage. Blockage is a problem obstructing the long-acting operation of the constructed wetland, which seriously influences a sewage purification effect. Accumulated pollutants block pores of a substrate, leading to reduction of a hydraulic conductivity coefficient, slowdown of oxygen recovery in the substrate, deterioration of physicochemical environment and corresponding decrease of microbial activity, so as to finally allow a degradation rate of pollutants be further slowed.

Regardless of a surface flow, subsurface flow or vertical subsurface flow constructed wetland, their wetland treatment systems all have a problem of scarce reaeration capacity during the operation, causing sharp increase of organic load and seriously influencing the long-acting operation of the wetland system.

The siphon type composite subsurface flow constructed wetland undergoes technical innovation and design improvement in the aspect of the operation mode, and thus may significantly improve the reaeration capacity of a wetland sewage treatment system and may further greatly reduce the blockage risk of a wetland sewage treatment system.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, an objective of the disclosure is to provide a siphon type composite vertical subsurface constructed wetland in order to improve the problems of scarce reaeration capacity and sewage blockage of the existing wetland sewage treatment system, so as to allow efficient, long-acting and stable operation of the wetland sewage treatment system.

According to an embodiment, the technical solution may be achieved by the disclosure as follows: a siphon type composite vertical subsurface flow constructed wetland is provided, the constructed wetland may comprise an uplink pool and a downlink pool, wherein the depth of the uplink pool is ¾ of that of the downlink pool; siphon type drain tubes are equidistantly distributed at the right outer side of the uplink pool, and the total flow of the drain tubes is slightly greater than the largest total influent flow. Three layers of substrates are respectively paved on the uplink pool and the downlink pool, from top to bottom, a substrate on a first substrate layer is a biological ceramsite having a relatively small grain size, another substrate on a second substrate layer is zeolite having a relatively large grain size, and a further substrate on a third substrate layer is cobblestone having a large grain size. The first substrate layer and the second substrate layer of the downlink pool and the first substrate layer and the second substrate layer of the uplink pool are separated by barriers; the third substrate layers of the downlink pool and the uplink pool are integrally communicated, and sewage in the downlink pool flows to the uplink pool through a communication port. Sludge on bottom layers of the downlink pool and the uplink pool is discharged from a siphon tube along with water.

According to another embodiment, plants may be planted on the surface layer of the downlink pool, and water distributing tubes may be evenly distributed under the plants.

According to a further embodiment, the level of the sewage in the constructed wetland may fluctuate between high and low, and air continuously ingresses into and egresses from the wetland along with the fluctuation of the level of the sewage to increase the content of oxygen dissolved in the sewage and enhance the respiration of aerobic microbes adhered to the substrate, which may achieve an efficient aerobic sewage treatment.

According to one embodiment, the constructed wetland may timely and continuously discharge sludge deposited on the bottom layer by virtue of a siphon action so that silted sludge generated during sewage treatment is not accumulated and solidified on the wetland for a long term, which may effectively solve the problem that the wetland is silted and blocked and may further achieve a long-acting and stable operation of sewage treatment.

In some embodiments, a siphon type composite subsurface flow constructed wetland may comprise an uplink pool and a downlink pool. Both of the uplink pool and the downlink pool are planted with plants which have a large planted plant biomass and a strong pollutant absorption and degradation capability. In winter and spring, the planted plants are Rumex acetosa L., and in summer and autumn, the planted plants are pennisetum sinese, facilitating plant growth along with alternation of seasons.

In other embodiments, the work principle of the disclosure is as follows: in the siphon discharge process, one part of substrate layers of the siphon type composite vertical subsurface flow constructed wetland of the disclosure is always in air, and aerobic microbes are adhered to the substrates to perform aerobic treatment on sewage; the other part of the substrate layers is in an anoxic state, and aerobic microbes are adhered to the substrates to perform facultative or anaerobic treatment on sewage; different substrates adsorb and absorb sewage pollutants to be removed, and surface plants absorb sewage pollutants to be removed. Under the siphon action, sludge on the substrate layers of the siphon type composite vertical subsurface flow constructed wetland is timely and continuously discharged from the wetland to effectively solve the deposition and solidification problems of sludge, which may effectively solve the problem of wetland blockage. The siphon type composite vertical subsurface flow constructed wetland organically unifies a biological method and an ecological method in sewage treatment, and greatly reduces the risk of wetland blockage.

Some embodiments of the present invention may have one or more of the following effects: the constructed wetland may be designed into construction of the uplink pool and the downlink pool so that the depth of the uplink pool is ¾ of that of the downlink pool, which may facilitate sufficient reaeration of the wetland in time and space, improve the activity of aerobic microbes adhered to the substrates, and enhance the efficiency of aerobic degradation of sewage pollutants. A drainage technology designed by the disclosure may utilize a siphon type drain tube to drain water and effectively utilizes the siphon action to perform cyclic reaeration on gaps of the substrates of the wetland. And this may increase the content of oxygen dissolved in the sewage, improve the activity of microbes adhered to the substrates, and enhance the efficiency of biological sewage treatment. The silted sludge may be timely, continuously, and thoroughly discharged while draining water with the siphon type drain tube. Thus, embodiments may solve the blockage problem in the sewage treatment system of the wetland.

BRIEF DESCRIPTION OF THE DRAWINGS

FIG.1 illustrates a siphon type composite vertical subsurface flow constructed wetland according to the disclosure.

DETAILED DESCRIPTION

An embodiment of the disclosure is shown in FIG.1, which illustrates a siphon type composite vertical subsurface flow constructed wetland according to the disclosure. In FIG. 1, 1 represents plants, 2 represents a first substrate layer, 3 represents a second substrate layer, 4 represents a third substrate layer, 5 represents a downlink pool, 6 represents a communication port of the downlink pool and an uplink pool, 7 represents the uplink pool, and 8 represents a siphon type drain tube.

According to an embodiment, the system provides a siphon type composite vertical subsurface flow constructed wetland, the constructed wetland may comprise an uplink pool 7 and a downlink pool 5, wherein the depth of the uplink pool is ¾ of that of the downlink pool; siphon type drain tubes 8 are equidistantly distributed at the right outer side of the uplink pool, and the total flow of the drain tubes is slightly greater than the largest total influent flow. Three layers of substrates are respectively paved on the downlink pool 5 and the uplink pool 7, from top to bottom, a substrate on a first substrate layer 2 is a biological ceramsite having a relatively small grain size, another substrate on a second substrate layer 3 is zeolite having a relatively large grain size, and a further substrate on a third substrate layer 4 is cobblestone having a large grain size. The first substrate layer and the second substrate layer of the downlink pool and the first substrate layer and the second substrate layer of the uplink pool are separated by barriers; the third substrate layers of the downlink pool and the uplink pool are integrally communicated, and sewage in the downlink pool flows to the uplink pool through a communication port 6. Sludge on bottom layers of the downlink pool and the uplink pool is discharged from a siphon type drain tube 8 along with water.

It can be seen from the whole flow process of sewage treatment of the siphon type composite subsurface flow constructed wetland that sewage enters the wetland through the water distributing tubes of the downlink pool 5 after being previously pretreated, and plants 1 planted on the surface of the downlink pool absorb and degrade pollutants in the sewage. The plants absorb pollutants, such as nitrogen and phosphorus, in the sewage, grow and propagate, and are cut until growing to a certain extent.

The sewage flows to the first substrate layer 2 and the second substrate layer 3 via the plants 1 on the surface of the downlink pool 5, and enters the uplink pool 7 through the communication port 6 of the third substrate layer 4; the sewage is further treated through the second substrate layer 3 and the first substrate layer 2 in the uplink pool 7. The substrates in the substrate layers and microbes adhered to the substrates remove pollutants, such as nitrogen, phosphorus and organic matters, in the sewage, through a series of physical, chemical and biological ways, such as absorption, adsorption, filtration, ion exchange and complex reaction.

When the level of water in the uplink pool 7 reaches the root system of the plants 1 on the surface, the plants further absorb pollutants, such as nitrogen and phosphorus, in the sewage, grow and propagate, and are cut until growing to a certain extent.

The sewage subjected to a series of treatments is discharged from the wetland via the siphon type drain pipe 8. The sludge silted on the bottom layer of the wetland is discharged via the siphon tube along with the treated sewage so as to timely and efficiently clear the sludge generated during sewage treatment, which may greatly reduce the risk of wetland blockage.

In various embodiments, a siphon type composite vertical subsurface constructed wetland may show good sewage purification effect, the constructed wetland is not easily blocked and may improve reaeration capability of a treatment system and enhance an aerobic biodegradation efficacy, and the constructed wetland may be simple in structure and easy to maintain and manage.

Embodiments of the present specification may be described in a progressive manner; each embodiment focuses on the difference from other embodiments, and the same and similar parts between the embodiments may refer to each other.

The above embodiments are provided merely for the purpose of describing the present invention and are not intended to limit the scope of the present invention. Various equivalent replacements and modifications made without departing from the spirit and scope of the present invention should fall within the scope of the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

What is claimed is:

1. A siphon type composite vertical subsurface flow constructed wetland, comprising:
    an uplink pool and a downlink pool, a depth of the uplink pool being ¾ of a depth of the downlink pool;
    siphon type drain tubes equidistantly distributed at a first outer side of the uplink pool driven by a depth difference between the uplink pool and the downlink pool, a total flow through the drain tubes being greater than a total influent flow; and
    three layers of substrates on the uplink pool and the downlink pool, from top to bottom, a substrate on a first substrate layer being a biological ceramsite, another substrate on a second substrate layer being zeolite, a further substrate on a third substrate layer being cobblestone; the first substrate layer and the second substrate layer of the downlink pool and the first substrate layer and the second substrate layer of the uplink pool being separated by barriers, the third substrate layers of the downlink pool and the uplink pool being integrally communicated, and sewage in the downlink pool being configured to flow to the uplink pool through a communication port; and
wherein:
    the biological ceramsite has a grain size smaller than that of the zeolite;
    the zeolite has a grain size smaller than that of the cobblestone;
    the first substrate layer comprises aerobic microbes adhered thereto for an aerobic sewage treatment;
    at least one part of the first substrate layer is always in air; and
    the siphon type drain tubes are configured to discharge sludge in the third substrate layer along with water.

2. The siphon type composite vertical subsurface flow constructed wetland according to claim 1, further comprising plants planted on the first substrate layer of the downlink pool and water distributing tubes evenly distributed under the plants.

* * * * *